(12) United States Patent
Scheit et al.

(10) Patent No.: US 6,253,622 B1
(45) Date of Patent: Jul. 3, 2001

(54) DEVICE FOR INDICATING WHEN A SET VALUE OF A CLAMPING FORCE OF A TIGHTENABLE CLAMP IS REACHED

(75) Inventors: Peter Scheit, Frankfurt; Wolfgang Barbett, Rhede, both of (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 09/631,231

(22) Filed: Aug. 2, 2000

(30) Foreign Application Priority Data

Aug. 14, 1999 (DE) .............................................. 199 38 606

(51) Int. Cl.[7] ...................................................... G01N 3/08
(52) U.S. Cl. .................................................. 73/821; 73/856
(58) Field of Search .............................. 73/818, 821, 824, 73/856

(56) References Cited

U.S. PATENT DOCUMENTS

| 4,629,217 | 12/1986 | Straub . | |
|---|---|---|---|
| 5,528,942 | * 6/1996 | Baratta | 73/856 |
| 5,602,341 | * 2/1997 | Lee et al. | 73/850 |
| 5,945,607 | * 8/1999 | Peppel et al. | 73/856 |

FOREIGN PATENT DOCUMENTS

| 8521410 | 10/1985 | (DE) . |
|---|---|---|
| 198 02 676 C1 | 5/1999 | (DE) . |

OTHER PUBLICATIONS

Zuverlaessiges Verbindungssystem fuer Metall– und Kunststoffrohre, Bd. 37, No. 9/03, Sep. 1, 1998, p. 636.

* cited by examiner

Primary Examiner—Max Noori
(74) Attorney, Agent, or Firm—Friedrich Kueffner

(57) ABSTRACT

An indicator device is provided for indicating that a set value of a clamping force of a tightenable clamp has been reached. The clamp has an approximately C-shaped clamp strip with first and second circumferential ends facing one another in a circumferential direction of the clamping strip and axial ends extending in the circumferential direction from the first circumferential end to the second circumferential end. The axial ends have radially inwardly projecting end face walls with a radially inner edge. Clamping jaws are connected to the first and second circumferential ends. The indicator device has at least one breakable indicator element for each one of the end face walls, wherein the breakable indicator elements can be placed onto the radially inner edge of the end face wall. The breakable indicator elements break when the set value of the clamping force of the clamp is reached and a predetermined spacing of the radially inner edge of the end face walls from a cylindrical object clamped in the clamp is reached.

10 Claims, 6 Drawing Sheets

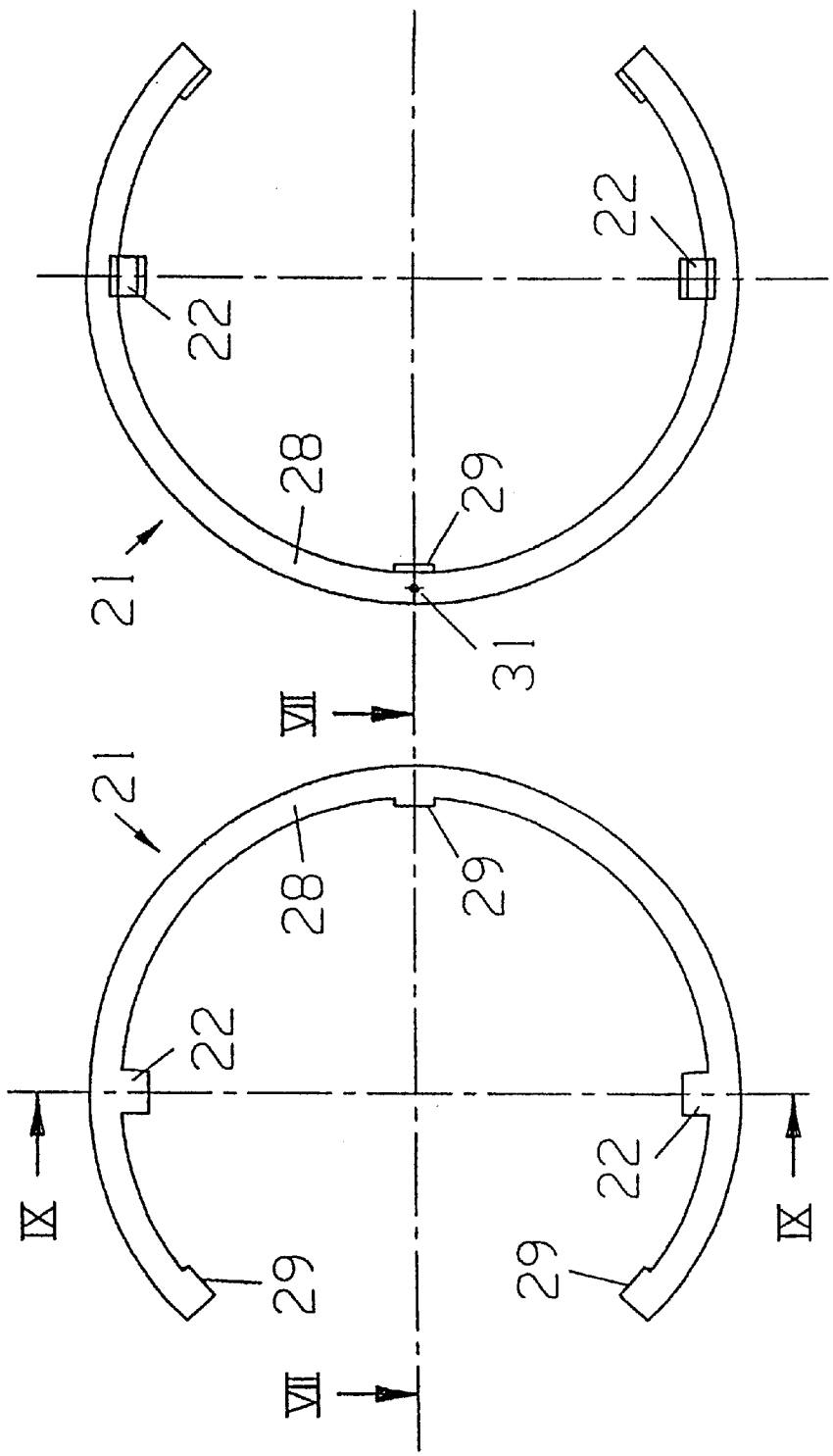

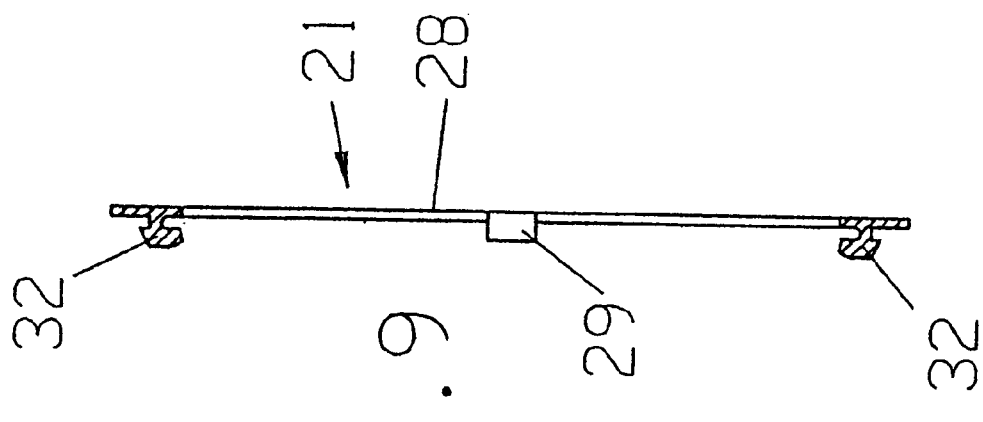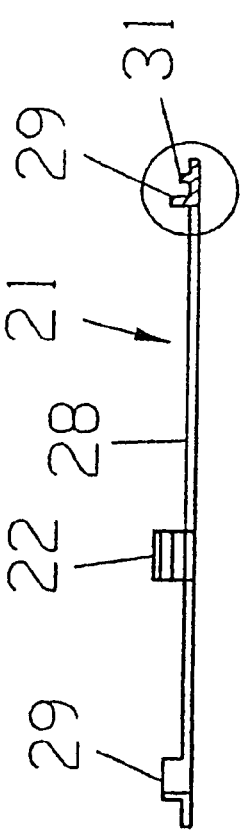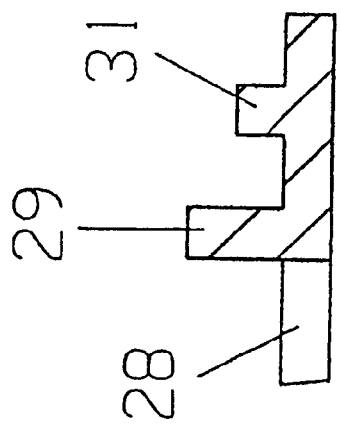

DEVICE FOR INDICATING WHEN A SET VALUE OF A CLAMPING FORCE OF A TIGHTENABLE CLAMP IS REACHED

BACKGROUND OF THE INVENTION

1. Field of the Invention

The invention relates to a device for indicating when a set value of a clamping force of a tightenable clamp has been reached, wherein the tightenable clamp is comprised of a substantially C-shaped clamp strip having radially inwardly pointing end face walls at its axial ends and having clamping jaws provided on the end portions extending in the circumferential direction.

2. Description of the Related Art

In known clamps of this kind (DE 198 02 676 C1), which are used, for example, as pipe couplings for axially connecting two pipes, the clamping jaws are connected by at least one clamping screw which is tightened by a torque wrench in order to apply a predetermined force. The torque adjusted on the torque wrench, however, is not in all situations a precise measure for the set value of the clamping force. For example, when the screws are greased or provided with a washer or have different types of coatings, different radial clamping forces result for the clamp, and this leads to different mounting and operating results.

SUMMARY OF THE INVENTION

It is an object of the present invention to provide an indicator device of the aforementioned kind whose indication corresponds with high reliability and precision to the set value of the clamping force of the clamp.

In accordance with the present invention, this is achieved in that the indicator device has at least one breakable indicator element for each end face wall of the clamp strip which can be seated on the radially inner edge of the end face wall and, in the mounted position of the indicator element, will break upon reaching the set value of the clamping force of the clamp and a predetermined spacing of the inner edge of the end face wall from a cylindrical object clamped in the clamp.

According to this solution, the indicator elements will break upon reaching the set value of the clamping force of the clamp independently of possible diameter tolerances of the clamped objects, for example, pipes, or the surface condition of the employed clamping screw or screws. The breakage of the indicator elements then will provide a clearly noticeable sign during mounting of the clamp that the desired clamping force has been reached and, moreover, that the permissible or desired compression of the sealing sleeve or soundproofing sleeve, optionally provided in the clamp, has been reached.

In more detail, it can be provided that each indicator element has a substantially U-shaped part and a support leg oriented oppositely to one of the two legs of the U-shaped part and aligned with this one leg for supporting the U-shaped part on the cylindrical object clamped in the clamp, wherein the end face wall engages between the two legs of the U-shaped part, the length of the support leg is selected to be identical to the predetermined spacing, and the transverse portion connecting the legs of the U-shaped part has a breaking strength which is exceeded in the mounted position of the indicator element upon reaching the set value of the clamping force of the clamp. In this context, the end face wall provided with the indicator element presses against the transverse portion when the clamp is tightened while the indicator element with the support leg is supported on the clamped object until the transverse portion breaks at the predetermined set value of the clamping force determined by the selection of the breaking strength of the transverse portion.

As an alternative, it can be provided that the U-shaped part has a second support leg oriented oppositely to the other leg of the U-shaped part and aligned with this other leg and having a length corresponding to the spacing for supporting the U-shaped part on the cylindrical object, wherein the end face wall engages with play between the two legs of the U-shaped part.

Preferably, the support legs of the indicator element taper toward their free ends and axially outwardly. A bending moment or transverse moment is then exerted onto these tapered ends of the support legs of the indicator element during tightening of the cylindrical object, which moment causes a spreading of these support legs and this spreading assists in the breaking of the transverse portion so that breakage will occur for a very precisely defined value of the clamping force.

The leg of the U-shaped part of the indicator element, which is positioned at the axially outer side of the end face wall in the mounted position of the U-shaped part, preferably forms a portion of a C-shaped ring which rests against the end face wall. By means of this ring it is possible for the manufacturer of the clamp to pre-mount the indicator element on the clamp so that mounting of the indicator element at the assembly site is eliminated. Upon reaching the set value of the clamping force, not only at least one broken-off piece of the indicator element will fall off the clamp but also the C-shaped ring. This provides an even more noticeable indication that the clamping force has been reached.

Moreover, the C-shaped ring can be provided with projections distributed over the circumference of the C-shaped ring which, in the mounted position of the C-shaped ring, project axially inwardly and rest against the radially inwardly positioned edge of the end face wall. These projections prevent, in addition to the securing action of the indicator element, a radial movement of the ring in its plane when it is loaded in this plane by forces which do not act in a direction in which the indicator element prevents a displacement, for example, forces occurring during the transport of the clamp together with the ring. In addition, the ring can have a further projection which in the mounted position of the ring projects axially inwardly and engages a hole in the end face wall. This, moreover, prevents a rotation of the ring so that it maintains a predetermined rotational position relative to the clamp, preferably in such a way that the gap between its ends is congruent with the gap between the clamping jaws and that in the case of a radial mounting of the clamp on a pipe this pipe can be guided through both gaps.

Moreover, the leg of the U-shaped part of the indicator element, resting in the mounted position of the U-shaped part on the inner side of the end face wall, may be provided with a slanted surface on its side facing away from the end face wall, wherein the slanted surface extends to the free end of the leg. This facilitates mounting of the C-shaped rings provided with the indicator elements.

Preferably, two indicator elements are provided for each end face wall. This makes it possible to cover a greater range of set values of the clamping force in connection with greater diameters of the cylindrical objects, in particular, pipes, to be clamped or connected.

Moreover, when the two indicator elements are positioned in the mounted position diametrically opposite one another relative to the clamp axis, a more uniform distribution of the clamping force onto the indicator elements will result.

BRIEF DESCRIPTION OF THE DRAWING

In the drawing:

FIG. 5 is an axial end view of the outwardly facing side of a C-shaped ring of the indicator device;

FIG. 6 is an axial end view of the inwardly facing side of the C-shaped ring according to FIG. 5;

FIG. 7 is a section along the line VII—VII of FIG. 5;

FIG. 8 shows the detail encircled in FIG. 7 on an enlarged scale; and

FIG. 9 is a section along the line IX—IX of FIG. 5.

DESCRIPTION OF THE PREFERRED EMBODIMENTS

Figure 1:
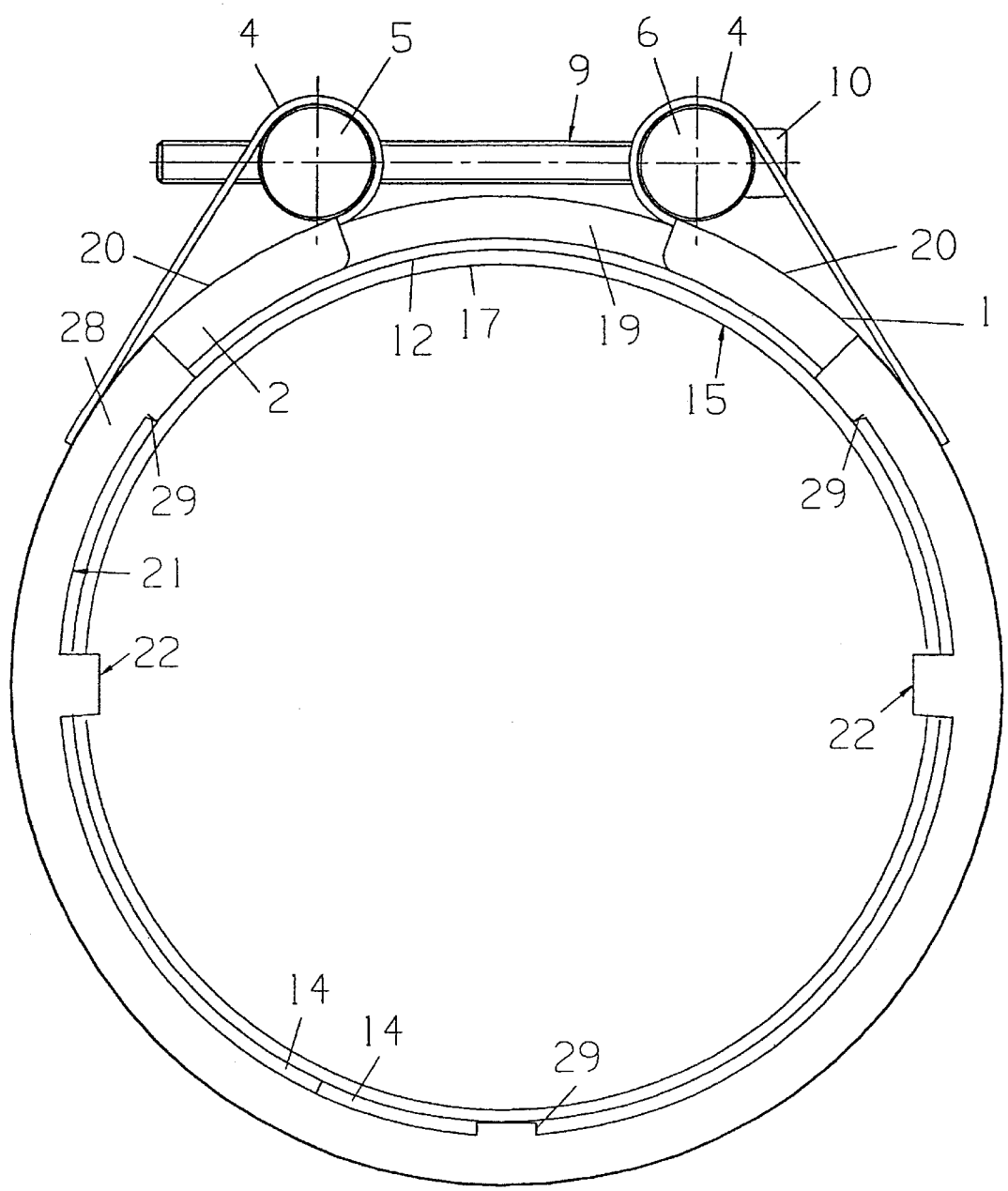
FIG. 1 is a side view of a clamp for use as a pipe coupling with an indicator device according to the invention.
Figure 2:
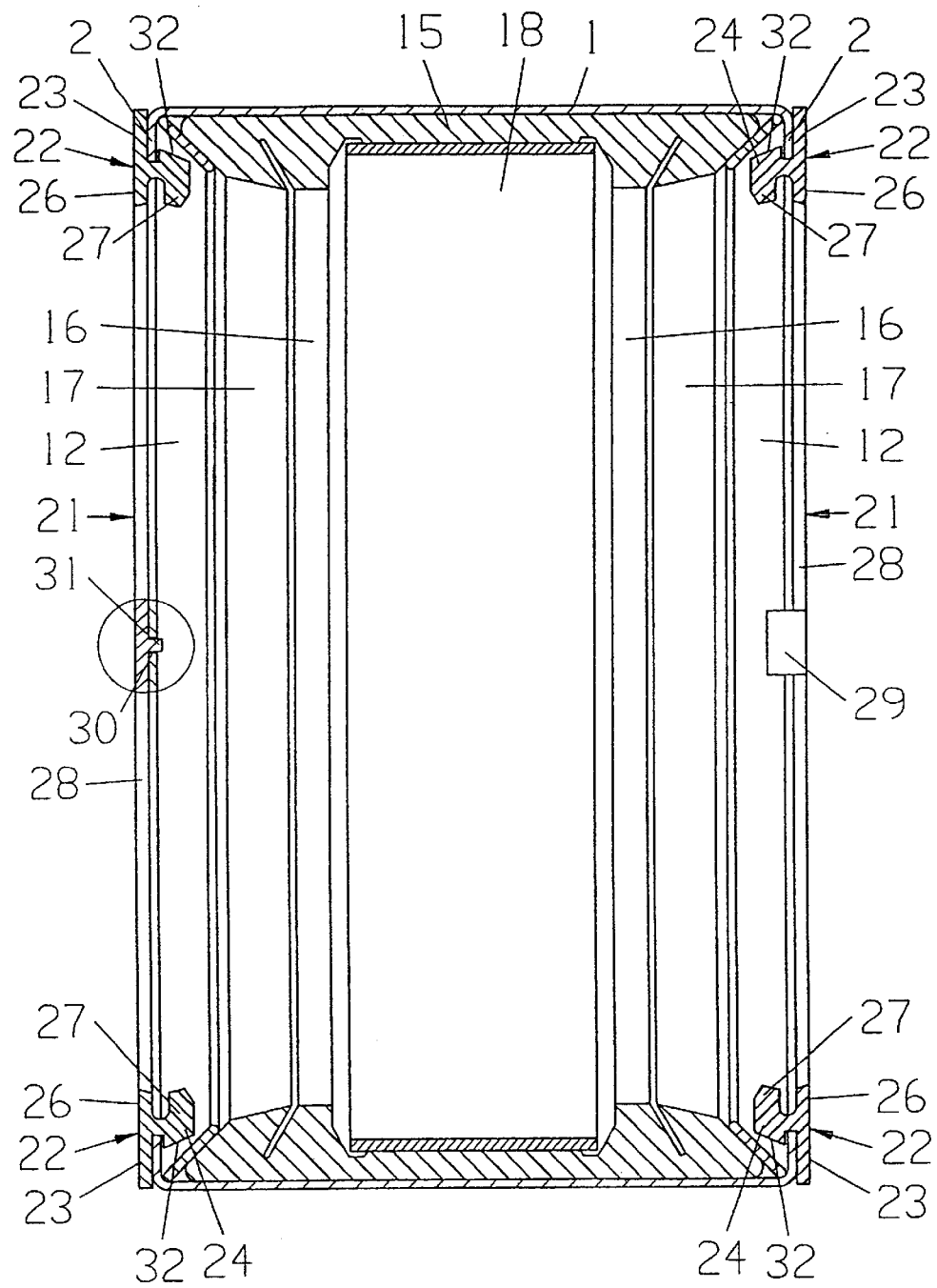
FIG. 2 is an axial section of the clamp according to FIG. 1.

The clamp represented in FIGS. 1 through 3 serves as a pipe coupling and is configured as follows. A clamp strip 1, bent from sheet steel to form an incomplete ring, has at its axial ends radially inwardly bent end face walls 2 whose inner diameter is greater than that of smooth pipes 3 to be axially connected (FIG. 3) by the clamp. The clamp strip 1 is interrupted in the circumferential direction and is provided with clamping jaws 4 (FIG. 1) at the ends delimiting the gap. The clamping jaws 4 are formed as a loop of the clamp strip 1 bent about a respective round bolt 5, 6 onto the outer side of the clamp strip 1 where they are connected by projection welding. The loops of the clamping jaws 4 each have two slots which partially extend about the respective round bolt 5, 6. The round bolt 6 has a transverse through bore without inner thread in the area of each of the slots of the loop bent about the bolt 6. The round bolt 5 has also a transverse through bore, but provided with an inner thread, in the area of each slot of the other loop. The slots in the loops and the transverse bores of the round bolts 5, 6 are each penetrated by a clamping bolt 9 whose head 10 has a hexagon socket and rests against a shoulder of a blind bore that widens the through bore of the round bolt 6.

A radially outer edge of a truncated cone-shaped ring 12 that is interrupted once in the circumferential direction rests against the inner side of the bent edge of each of the end face walls 2 of the clamp strip 1. The rings 12 are formed of a metal strip. The radially inner edges of the rings 12 have relatively sharp edges or are provided with teeth in the plane of the metal strip. The end portions 14 (FIG. 1) of each ring 12 overlap one another in the circumferential direction.

On the inner side of the clamp strip 1 a sealing sleeve 15 made of elastomeric material is provided which has sealing lips 16, 17 projecting from each axial end of the sleeve 15 radially inwardly. The sealing lips 16, 17 rest against the exterior of the pipes 3 when, according to FIG. 3, the pipes 3 are inserted into the pipe coupling and clamped therein. Between the two sealing lips 16 a ring 18 formed of a sheet metal strip is resting against the inner side of the sealing sleeve 15. This ring 18 is interrupted once in the circumferential direction and its end portions also overlap in the circumferential direction. The ring 18 ensures that the material of the sealing sleeve 15 is not forced between the ends of the pipes 3 when the pipe coupling is tightened.

The gap of the clamp strip 1 between the clamping jaws 4 is bridged by a bridge 19 which rests against the circumference of the sealing sleeve 15 and is overlapped by end portions 20 of the clamp strip 1. The bridge 19 is welded to the inner side of one of the end portions 20 by spot welding.

Figure 4:
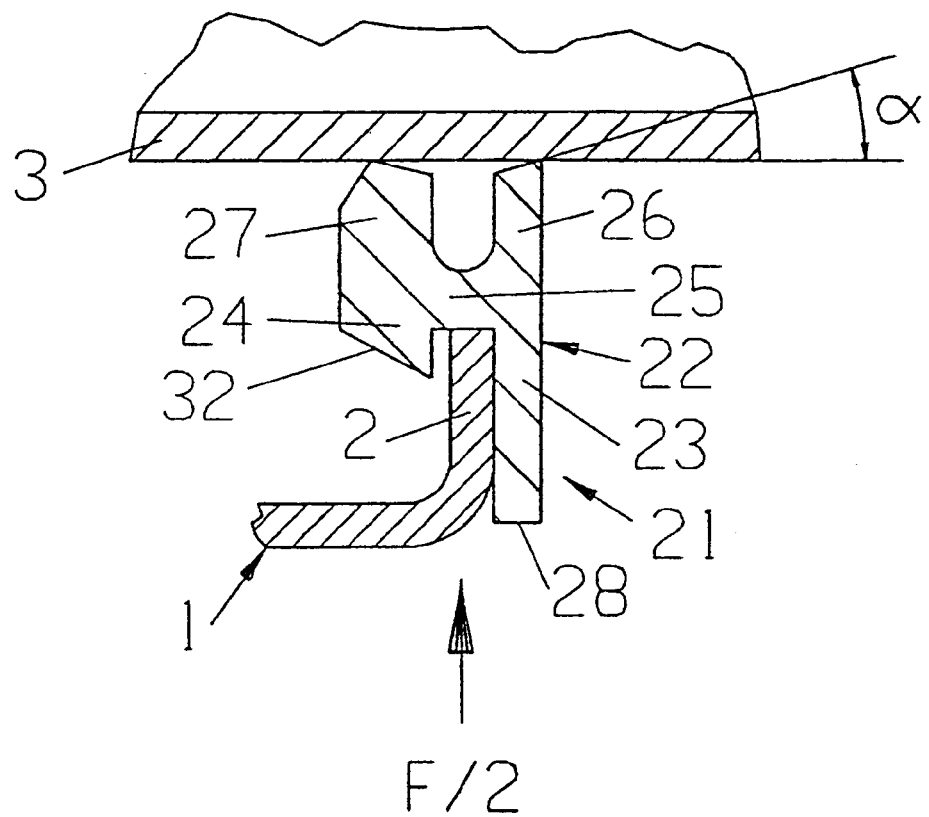
FIG. 4 shows a detail of parts of FIG. 3.

The clamp is provided with a device 21 for indicating that the set value of the clamping force F (FIG. 4) of the clamp and the desired or permissible compression of the sealing sleeve 15 have been reached. The indicator device 21 has two approximately H-shaped indicator elements 22 for each end face wall 2 of the clamp strip 1. The indicator elements 22 have each a substantially U-shaped part with two legs 23 and 24 and a transverse portion 25 connecting these two legs 23, 24. The indicator elements 22 can be placed onto the radially inner edge of the end face wall 2. In this connection, the end face wall 2 engages between the legs 23, 24 of each indicator element 22 with play, see especially FIG. 4. The transverse portion 25 connecting the legs 23, 24 of the indicator element 22 has a breaking strength which is exceeded in the mounted position of the indicator element 22 when the set value of the clamping force F of the clamp is reached.

Each indicator element 22 has moreover two support legs 26, 27 which in the represented mounted position are both positioned radially inwardly and taper toward their free ends and axially outwardly relative to the H-shape at an angle α of approximately 10, to 25°, preferably approximately 15 to 18°, and in the represented embodiment 17°. The support legs 26, 27 support the clamp on the pipes 3 before clamping takes place. The length of these support legs 26, 27 is selected such that it matches a predetermined spacing of the radially inner edges of the end face walls 2 from the pipes 3 at which predetermined spacing the set value of the clamping force of the clamp and the permissible or desired compression of the sealing sleeve 15 is reached when the clamp is tightened.

The leg 23 of each indicator element 22, resting in the mounted position of the indicator element 22 on the axially outer side of the end face wall 2, forms a part of a C-shaped ring 28 which rests against the end face wall 2 of the clamp strip 1.

The ring 28 has projections 29 distributed about its circumference which in the mounted position of the ring 28 project axially inwardly and rest against the radially inner edge of the end face wall 2. The ring 28 has a projection 31 (FIG. 2 and FIGS. 6 through 8) which in the mounted position projects axially inwardly into a hole 30 (see the detail shown in section in FIG. 2 in the encircled region).

The leg 24 of each indicator element 22, which leg is positioned on the inner side of the end face wall 2 has a slanted surface 32 (FIGS. 2 through 4 and FIG. 9) on its side facing away from the end face wall 2. This slanted surface 32 extends to the free end of the leg 24.

The indicator device 21 is comprised of plastic material, preferably polystyrene, or brittle materials and is pre-mounted by the manufacturer of the clamp after assembly of the sealing sleeve 15, the ring 18, and the rings 12 within the clamp strip 1. In this connection, the rings 28 are each pushed from the outer side of the respective end face wall 2 against the end face wall 2 and the respective radially inner edge of the end face wall 2 glides across the slanted surface 32 of the leg 24 and snaps into place between the legs 23 and 24. In the rotational (angular) position of the indicator device 21 according to FIG. 1 relative to the clamp, the projections 31 of the rings 28 each engage one of the holes 30 of the end face walls 2. The engagement of the end face walls 2 in the groove between the legs 23 and 24 secures the axial position of the rings 28 on the clamp, and the engagement of the projections 31 in the holes 30 secures the rotational position of the rings 28 relative to the clamp. The insertion of the rings 28 into the end face walls 2 results simultaneously in the projections 29 coming to rest against the radially inner edge of the end face walls 2 so that the rings 28 cannot move in their radial plane.

Figure 3:
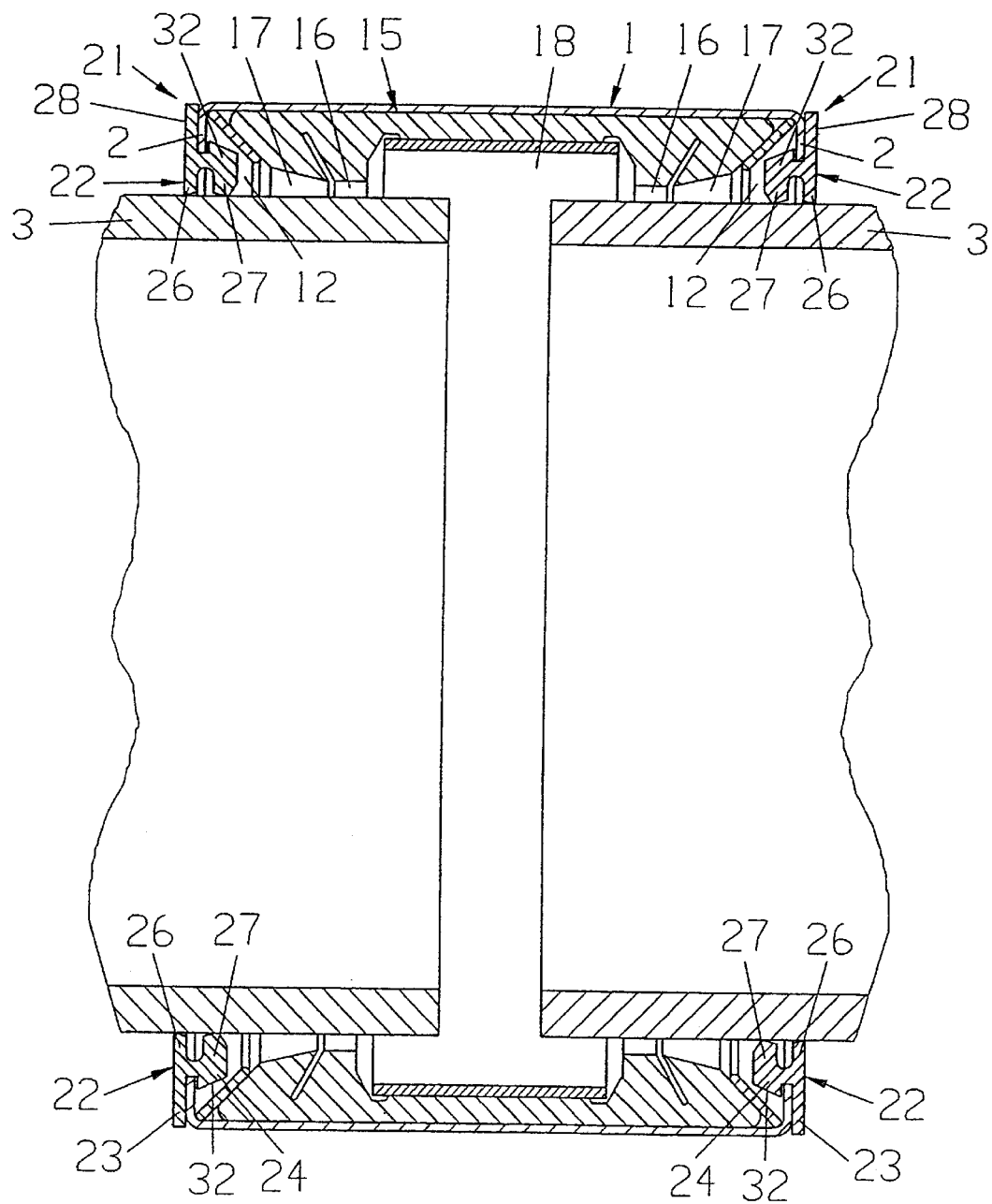
FIG. 3 is an axial section of the clamp according to FIG. 1 with end portions of two pipes to be connected to one another inserted in the clamp.

On site, where the clamp is to be mounted, the pipes 3 are axially inserted into the clamp, as illustrated in FIG. 3. Subsequently, the clamping screws 9 are tightened so that the end face walls 2 exert a force F according to FIG. 4 onto the transverse portions 25 of the indicator elements 22. The force F is distributed onto the support legs 26 and 27 of the indicator elements 22 resting with their tips or edges against the circumferential surface of the pipes 3. The force F and the reaction forces acting on the support legs 26, 27 result in a bending moment being exerted on each transverse portion 25, which moment, when the clamping force F exceeds the sum of the breaking strengths or flexural strengths of the transverse portions 25, which strenghts are determined according to the set value of the clamping force, causes breakage of the transverse portions 25 of all indicator elements 22. In this connection, the strength of each transverse portion 25 corresponds to a portion of the clamping force F matching the number of indicator elements 22. This has the result that the rings 28 will spring outwardly away from the clamp, and this is an easily recognizable indication that the set value of the clamping force has been reached. Following this event, the clamping screws 9 are not tightened any further. Preferably, the rings 28 are of a different color than the clamp strip 1, preferably of a flashy or conspicuous color so that the rings can be easily differentiated from the clamp. Once they have broken away from the clamp, the rings 28 can be removed from the pipes 3, if they have not yet fallen off by themselves.

By means of the tapered ends of the support legs 26, 27, tapering at the angle α, the support legs 26, 27 are supported relatively far axially outwardly of the center of the respective transverse portion 25 on the respective pipe 3 so that during tightening they have the tendency to spread apart and to exert a correspondingly high bending moment onto the transverse portion 25. The transverse portions 25 of the indicator elements 22 break thus at a relatively precisely defined clamping force F and the predetermined spacing between the inner radial edges of the end face walls 2 and the pipes 3, determined by a corresponding selection of the length of the support legs 26, 27, which at the same time ensures that a permissible or desired compression of the sealing sleeve 15 is reached.

Developments of the represented embodiment can, for example, reside in that each ring 28 is provided with only one indicator element 22. However, the use of two, especially diametrically oppositely arranged, indicator elements 22 has the advantage that greater set values of the clamping forces, corresponding to the sum of the breaking strengths of the transverse portions 25 of all indicator elements 22, can be selected for greater diameters of the pipes 3. Moreover, the rings 28 can be eliminated so that only one or two H-shaped indicator elements 22 would be placed onto the radially inner edge of each end face wall 2. However, the rings 28 connecting the H-shaped indicator elements 22 have the advantage that the indicator elements 22 can be easily and safely pre-mounted by the manufacturer of the clamp. Moreover, it is possible to eliminate the leg 27 of the indicator elements 22 so that the U-shaped part, comprised of the legs 23 and 24 and the transverse portion 25, rests only with the support leg 26 that is aligned with the leg 23 on the corresponding pipe 3.

Instead of connecting individual indicator elements 22 by means of a ring 28, an indicator element in the form of a C-shaped ring, i.e., open ring, can be placed on each of the radially inner edges of the end face walls 2, wherein this C-shaped ring has a radial cross-section corresponding over its entire circumference to that of an indicator element 22.

Instead of being used in connection with a pipe coupling, the illustrated indicator device 21, or the described developments thereof, can also be used for attaching a pipe or any other cylindrical object, for example, a cable, to a building wall or the like, wherein such a fastening clamp can have an elastomeric soundproofing sleeve instead of the sealing sleeve. In both types of clamp the rings 12 can be omitted.

While specific embodiments of the invention have been shown and described in detail to illustrate the inventive principles, it will be understood that the invention may be embodied otherwise without departing from such principles.

What is claimed is:

1. An indicator device for indicating that a set value of a clamping force of a tightenable clamp has been reached, wherein the clamp comprises an approximately C-shaped clamp strip, having first and second circumferential ends facing one another in a circumferential direction of the clamping strip and axial ends extending in the circumferential direction from the first circumferential end to the second circumferential end, wherein the axial ends have radially inwardly projecting end face walls with a radially inner edge, and further comprising clamping jaws connected to the first and second circumferential ends, the indicator device comprising:

at least one breakable indicator element for each one of the end face walls, wherein the breakable indicator element is configured to be placed onto the radially inner edge of the end face wall;

wherein the breakable indicator elements are configured to break when the set value of the clamping force of the clamp is reached and a predetermined spacing of the radially inner edge of the end face walls from a cylindrical object clamped in the clamp are reached.

2. The indicator device according to claim 1, wherein each indicator element comprises an approximately U-shaped part, having a first leg and a second leg and a transverse portion connecting the first and second legs to form the U-shape, and further comprises a first support leg aligned with the first leg of the U-shape and pointing in a direction away from the first leg of the U-shape, wherein the first support leg is configured to support the indicator element on the cylindrical object., wherein the end face walls are received between the first and second legs of the U-shape, wherein a length of the first support leg is configured to be identical to the predetermined spacing, and wherein the transverse portion has a breaking strength which is exceeded in the mounted state of the indicator element when the set value of the clamping force is reached.

3. The indicator device according to claim 2, wherein the U-shaped part comprises a second support leg aligned with the second leg of the U-shape and pointing in a direction away from the second leg of the U-shape, wherein the second support leg is configured to support the indicator element on the cylindrical object and has a length identical to the predetermined spacing, and wherein the end face walls are configured to be positioned with play between the first and second legs of the U-shape.

4. The indicator device according to claim 3, wherein the first and second support legs taper in a direction away from the first and second legs of the U-shape and in an outward direction of the U-shape.

5. The indicator device according to claim 2, further comprising C-shaped rings configured to be mounted on the clamp so as to rest against the end face walls, wherein the first leg of the U-shape, positioned in the mounted position of the indicator element on the axially outer side of the end face wall, is a part of the C-shaped ring.

6. The indicator device according to claim 5, wherein the C-shaped ring has first projections distributed in the circumferential direction of the clamp and configured to project axially inwardly into the clamp in the mounted position of the C-shaped ring on the clamp, wherein the first projections rest against the radially inner edge of the end face wall.

7. The indicator device according to claim 6, wherein the C-shaped ring has a second projection configured to engage a hole, provided in the end face wall, in the mounted position of the C-shaped ring on the clamp.

8. The indicator device according to claim 5, wherein the second leg of the U-shape, positioned in the mounted position of the U-shaped part on the clamp radially inwardly of the end face wall, has a slanted surface on a side of the second leg facing away from the end face wall, wherein the slanted surface extends to the free end of the second leg.

9. The indicator device according to claim 1, wherein two of the indicator elements are provided on each one of the end face walls.

10. The indicator device according to claim 9, wherein the two indicator elements on each one of the end face walls are positioned diametrically opposite one another.

* * * * *